United States Patent [19]

Babjak et al.

[11] Patent Number: 5,157,100
[45] Date of Patent: Oct. 20, 1992

[54] METHOD FOR EXTENDING THE POT-LIFE OF POLYOL-POLYISOCYANATE MIXTURES

[75] Inventors: John R. Babjak, Tinley Park; Thomas W. Yokoyama, Sauk Village, both of Ill.

[73] Assignee: The Sherwin-Williams Company, Cleveland, Ohio

[21] Appl. No.: 763,037

[22] Filed: Sep. 20, 1991

[51] Int. Cl.$^5$ .................... C08G 18/42; C08G 18/34; C08L 75/00
[52] U.S. Cl. ........................................ 528/73; 528/84; 525/127
[58] Field of Search .................... 528/73, 84; 525/127

[56] References Cited

U.S. PATENT DOCUMENTS

| | | | |
|---|---|---|---|
| 2,929,800 | 3/1960 | Hill | 525/403 |
| 3,194,770 | 7/1965 | Hostettler | 252/431 |
| 3,235,518 | 2/1966 | Hostettler et al. | 521/124 |
| 3,317,480 | 5/1967 | Fetscher et al. | 528/73 |
| 3,476,933 | 11/1969 | Mendelsohn | 521/111 |
| 3,493,540 | 2/1970 | Muller et al. | 528/73 |
| 3,666,835 | 5/1972 | Schloss | 528/66 |
| 3,681,272 | 8/1972 | Gloskey | 521/115 |
| 3,892,715 | 7/1975 | Bonin | 528/56 |
| 3,896,089 | 7/1975 | Noda et al. | 528/73 |
| 3,919,174 | 11/1975 | Taller | 528/80 |
| 3,972,846 | 8/1976 | Mori et al. | 528/85 |
| 3,997,513 | 12/1976 | Noda et al. | 528/73 |
| 4,019,933 | 4/1977 | Cuksee et al. | 149/19.4 |
| 4,096,128 | 6/1978 | Frisch et al. | 528/54 |
| 4,124,568 | 11/1978 | Zecher | 528/59 |
| 4,160,065 | 7/1979 | Loewrigkeit et al. | 528/59 |
| 4,184,031 | 1/1980 | Graham et al. | 528/56 |
| 4,235,766 | 11/1980 | Kuijper | 528/66 |
| 4,361,692 | 11/1982 | Ammons | 528/51 |
| 4,426,510 | 1/1984 | DelDonno | 528/49 |
| 4,434,284 | 2/1984 | Rukavina et al. | 528/48 |
| 4,654,409 | 3/1987 | Shirai et al. | 528/73 |
| 4,877,829 | 10/1989 | Vu et al. | 524/729 |
| 4,880,847 | 11/1989 | Credali et al. | 528/73 |
| 4,946,744 | 8/1990 | Shalati et al. | 428/500 |

Primary Examiner—Morton Foelak
Assistant Examiner—Rabon Sergent
Attorney, Agent, or Firm—Robert E. McDonald; Steven W. Tan

[57] ABSTRACT

A method for extending the pot-life of a curable composition comprising a mixture of at least one active hydrogen-containing material, such as a polyol or polyamine, and a polyisocyanate, which method comprises incorporating within the mixture a pot-life extending amount of a polyanhydride having an average of at least two anhydride groups per molecule.

32 Claims, No Drawings

000# METHOD FOR EXTENDING THE POT-LIFE OF POLYOL-POLYISOCYANATE MIXTURES

BACKGROUND OF THE INVENTION

1. Field of the Invention

This invention relates to a method for extending the pot-life of a curable composition comprising a mixture of at least one active hydrogen-containing material, such as a polyol or a polyamine, and at least one polyisocyanate by incorporating within the mixture a pot-life extending amount of a polyanhydride having an average of at least about two anhydride groups per molecule. This invention also relates to multi-component curable compositions comprising:

(i) at least one polyol or polyamine;
(ii) a polyisocyanate; and
(iii) a polyanhydride.

The curable compositions of this invention are especially useful as coatings and may typically be utilized as primers, topcoats or as clearcoats and/or basecoats in clearcoat/basecoat compositions. In particular, the combination of at least one polyol or polyamine, a polyisocyanate and a polyanhydride provides fast reacting, durable coatings having extended pot-life and excellent cure. The compositions of this invention could also be utilized as adhesives, elastomers and plastics.

2. Description of the Prior Art

Two-component curable mixtures comprising polyisocyanates and active hydrogen-containing compounds, such as polyols or polyamines, are well-known in the art to provide excellent performance and cure at low temperatures. However, due to the reactivity of the isocyanates and the active hydrogen-containing compounds, it is often difficult to obtain long pot-lifes of the mixture of polyisocyanate and active hydrogen-containing material and yet still enjoy the benefits of rapid cure. This is especially true for low VOC materials, which will incorporate relatively low levels of solvent and will frequently involve low molecular weight, but highly reactive, starting materials.

A number of approaches to extending the pot-life of mixtures of polyisocyanates and active hydrogen-containing compounds, have been taught in the prior art. For example, U.S. Pat. No. 4,426,510 teaches the use of beta-dicarbonyl compounds, alphahydroxy ketones, fused aromatic beta-diketones and beta-hydroxy nitrogen-heterocyclic fused aromatics as pot-life extenders for certain metal catalyzed polyol/polyisocyanate combinations. U.S. Pat. No. 4,235,766 teaches the addition of certain 2-methyl-2-alkanols to extend the pot-life of isocyanate/polyol mixtures. U.S. Pat. No. 4,096,128 teaches the use of certain triazoles to extend the pot-life of isocyanate/diamine mixtures. U.S. Pat. No. 4,019,933 teaches use of reaction products of tri-functional aziridinyl phosphine oxides with carboxylic acids to extend pot-life. U.S. Pat. No. 4,184,031 teaches the use of a composition of matter comprising a metallo organic compound and a carboxylic acid, or a compound convertible thereto, such as a carboxylic anhydride, by reaction with an active hydrogen compound. U.S. Pat. No. 4,877,829 teaches the use of organic and inorganic acids, such as benzoyl chloride, p-toluene sulfonic acid, formic acid, acetic acid, benzoic acid, phosphoric acid, hydrochloric acid and the like. The prior art has not, however, taught the combination of:

(i) a material having at least two active hydrogen groups per molecule, such as a polyol or a polyamine,
(ii) a polyisocyanate, and
(iii) a pot-life extending amount of a polyanhydride compound to provide low temperature curing, extended pot-life materials having excellent durability, hardness and performance upon cure. In addition to extending the pot-life of the isocyanate based system, the polyanhydrides also provide an additional mechanism for curing active hydrogen materials such as polyols and polyamines by reaction of the anhydride group with the hydroxyl or amine groups.

BRIEF SUMMARY OF THE INVENTION

This invention involves a method for extending the pot-life of a curable composition comprising a mixture of at least one polyol or polyamine and a polyisocyanate. The method comprises incorporating within the mixture a pot-life extending amount of a polyanhydride having an average of at least two anhydride groups per molecule. This invention also involves a multi-component curable composition which is reactive upon mixing of the components and which comprises the mixture of:

(i) at least one active hydrogen-containing material, especially a polyol or polyamine; and
(ii) a polyisocyanate; and
(iii) a polyanhydride having an average of at least about two anhydride groups per molecule.

When the curable composition is utilized as a coating it is especially preferred that at least one of the compounds (i), (ii) or (iii) comprises a film-forming polymer. The terms "active hydrogen-containing material", "polyamine", "polyol", "polyisocyanate" and "polyanhydride" are used in their broadest sense to include monomers, oligomers and polymers. The term "film-forming polymer" means any polymeric material that can form a film from evaporation of any carrier or solvent.

In its most preferred formulation, this invention involves a polyanhydride which is the free-radical addition polymerization product of at least one unsaturated monomer having anhydride functionality and at least one other ethylenically unsaturated monomer and the active hydrogen-containing portion comprises a low molecular weight diol or diamine and the addition polymerization product of at least one unsaturated monomer having active hydrogen functionality and at least one other ethylenically unsaturated monomer.

When utilized as a coating or an adhesive, it is especially preferred to utilize the curable composition of this invention in combination with about 5 to about 80%, and preferably 10 to about 40%, by weight of an inert solvent. It is convenient to provide the curable composition as a multicomponent system which is reactive upon mixing the components. Generally, the active hydrogen-containing component and the polyisocyanate component will be maintained in separate packages and mixed just prior to use. By incorporating a pot-life extending amount of a polyanhydride in the mixture, it has surprisingly been found that the pot-life of the mixture can be significantly extended and, in many cases, the hardness of the final cured product can actually be increased due to the incorporation of the polyanhydride material. It is generally preferred to add the polyanhydride to the active hydrogen-containing portion first and then add the polyisocyanate to that mixture.

Accordingly, it is an object of this invention to provide a method for extending the pot-life of mixtures of polyisocyanates and active hydrogen-containing materials such as polyols and polyamines by incorporating a polyanhydride into the mixture. It is a further object of this invention to provide curable, reactive compositions having extended pot-life. Another object of this invention is to provide curable compositions which are useful as primers, topcoats or clearcoats and/or basecoats in clearcoat/basecoat compositions. A preferred object is to provide curable compositions comprising:
(i) at least one polyol or polyamine,
(ii) a polyisocyanate, and
(iii) a polyanhydride.
Another object is to provide higher solid compositions comprising low molecular weight polyols or polyamines, polymeric polyols or polyamines, polyisocyanates, and at least a pot-life extending amount of a polyanhydride.

DETAILED DESCRIPTION OF THE INVENTION

1. Active Hydrogen-Containing Materials

The active hydrogen-containing materials useful in this invention have an average of at least two active hydrogen groups per molecule Active hydrogen functionality means those reactive groups as determined by the Zerewitinoff Method as described by Kohler in *J. Amer. Chem. Soc.*, 49, 3181 (1927) and include —OH, —COOH, —SH, and —NH. Especially preferred are the hydroxy-functional materials (polyols) and the amine-functional materials (polyamines).

The hydroxy-functional compounds which are useful in the practice of this invention have an average of at least two hydroxyl groups per molecule. It is especially preferred to utilize polymeric hydroxy-functional compounds as at least part of the polyol component. In order to provide higher solid, low viscosity curable compositions, lower molecular weight polyols or polyamines, e.g. those having a number average molecular weight less than about 400, can be used as reactive diluents in combination with the polymeric polyols or the low molecular materials can be used as the sole active hydrogen component.

The hydroxy-functional polymers will typically have a number average molecular weight of at least about 400. Typical number average molecular weights will range from about 400 to about 30,000, and especially 1,000 to about 15,000.

Representative hydroxy-functional polymers include the hydroxy-functional polyethers, polyesters, acrylics, polyurethanes, polycaprolacetones, etc., as generally described in Sections 1.1 through 1.5 below:

1.1. Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257–262, published by Interscience Publishers, Inc., 1951. Representative examples include the polypropylene ether glycols and polyethylene ether glycols such as those marketed as Niax ® Polyols from Union Carbide Corporation.

1.2. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

1.3. Additionally, hydroxy-functional polymers can be prepared by the ring opening reaction of polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

1.4. Other useful hydroxy-functional polymers can be prepared by the reaction of at least one polyol, such as those representatively described in Section 1.2 above, with polyisocyanates to produce hydroxy-functional urethanes. The polyols should, of course, be present at a level to provide an excess of hydroxyl groups over isocyanate groups. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages. 1.5. Useful hydroxy-functional polymers can also be conveniently prepared by free radical polymerization techniques such as in the production of acrylic resins. The acrylic polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as:

(i) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethylmethacrylate, propyl methacrylate, dimethylaminoethyl methacrylate, isobornyl methacrylate, ethyl tiglate, methyl crotonate, ethyl crotonate, etc.;

(ii) vinyl compounds such as vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, etc.;

(iii) styrene-based materials such as styrene, alpha-methyl styrene, alpha-ethyl styrene, alpha-bromo styrene, 2,6-dichlorostyrene, etc.;

(iv) allyl compounds such as allyl chloride, allyl acetate, allyl benzoate, allyl methacrylate, etc.;

(v) other copolymerizable unsaturated monomers such as ethylene acrylonitrile, methacrylonitrile, dimethyl maleate, isopropenyl acetate, isopropenyl isobutyrate, acrylamide, methacrylamide, dienes such as 1,3-butadiene, and halogenated materials such as 2-(N-ethylperflourooctenesulfonamido)ethyl(meth)acrylate.

The polymers are conveniently prepared by conventional free radical addition polymerization techniques. Frequently, the polymerization will be initiated by conventional initiators known in the art to generate a free radical such as azobis(isobutyronitrile), cumene hydroperoxide, t-butyl perbenzoate, etc. Typically, the monomers are heated in the presence of the initiator at temperatures ranging from about 35° C. to about 200° C., and especially 75° C. to 150° C., to effect the polymerization. The molecular weight of the polymer can be controlled, if desired, by the monomer selection, reaction temperature and time, and/or the use of chain transfer agents as is well known in the art.

Especially preferred in the practice of this invention are hydroxy-functional polyesters and hydroxy-functional free radical addition polymers. An especially preferred hydroxy-functional polymer is the addition polymerization reaction product of (a) 5 to 100, and especially 10 to about 40, weight percent of a hydroxy-functional ethylenically unsaturated monomer and (b) 0 to 95, and especially 60 to about 90, weight percent of at least one other ethylenically unsaturated monomer copolymerizable with the hydroxy-functional monomer.

Polyols having number average molecular weights less than about 400 are also useful as the polyol component, either by themselves or in combination with higher molecular weight polymeric polyols or polyamines. Low molecular weight polyols such as polyether polyols, polycaprolactone polyols and the polyols set forth in Section 1.2 hereof are representative of polyols which can have molecular weights less than about 400. In a preferred composition the polyol component will comprise a blend of 30 to 90 percent by weight of a polymeric polyol having a number average molecular weight greater than about 400 in combination with a 10 to 70 percent by weight of a low molecular weight polyol having a number average molecular weight less than about 400.

Polyamines are also useful as active hydrogen-containing compounds and can be prepared by methods well known in the art such as by the free radical polymerization of acrylic or other unsaturated monomers having primary or secondary amine functionality, or by the reaction of amines having at least two amine groups per molecule with a polycarboxylic acid to form polyamide amines, or by the reaction of primary amines with epoxy materials to produce secondary amine and hydroxyl functionality. The polyamines can be polymeric, typically having a number average molecular weight over 400, or lower molecular materials, such as piperazine, tetraethylenepentamine, 1,2-diaminopropane, etc. Also useful are the materials having a primary or secondary amine group and a hydroxyl group such as isopropanol amine, isobutanol amine, ethanol amine, etc.

2. Polyisocyanate Compounds

Polyisocyanates useful in the compositions of this invention have an average of at least about two isocyanate groups per molecule. Representative examples are taught in Section 1.4 hereof.

3. Polyanhydride Compounds

The anhydride-functional compounds which are useful in the practice of this invention can be any aliphatic or aromatic compound having at least two cyclic carboxylic acid anhydride groups in the molecule. Polymeric anhydrides having number average molecular weights between 500 and 7,000 are most useful. Especially preferred in the practice of this invention is the use of free radical addition polymers, such as acrylic polymers having anhydride functionality. These are conveniently prepared as is well known in the art by the polymerization under free radical addition polymerization conditions of at least one unsaturated monomer having anhydride functionality, such as maleic anhydride, citronic anhydride, itaconic anhydride, propenyl succinic anhydride, etc. with other ethylenically unsaturated monomers such as the esters of unsaturated acids, vinyl compounds, styrene-based materials, allyl compounds and other copolymerizable monomers, all as representatively taught in Section 1.5. of this specification. The monomers which are copolymerized with the unsaturated anhydride should, of course, be free of any functionality which could react with the anhydride group during the polymerization and could include copolymerizable acids such as acrylic acid or methacrylic acid. The anhydride-functional polymers can be conveniently prepared by conventional free radical addition polymerization techniques. Typically the polymerization will be conducted in an inert solvent and in the presence of a catalyst at temperatures ranging from 35° C. to about 200° C. An especially preferred anhydride-functional polymer comprises the free radical addition polymerization product of (a) 5 to 40, and especially 15 to about 25, weight percent of an ethylenically unsaturated monoanhydride and (b) 60 to 95, and especially 75 to about 85, weight percent of at least one other ethylenically unsaturated monomer copolymerizable with the ethylenically unsaturated anhydride.

Other polyanhydrides, in addition to the polymeric anhydrides prepared by a free radical addition process, can also be utilized in the practice of this invention. Ester anhydrides can be prepared, as is known in the art, by the reaction of e.g. trimellitic anhydride with polyols. Other representative, suitable polyanhydrides include poly-functional cyclic dianhydrides such as cyclopentane tetracarboxylic acid dianhydride, diphenylether tetracarboxylic acid dianhydride, 1,2,3,4-butane tetracarboxylic acid dianhydride, and the benzophenone tetracarboxylic dianhydrides such as 3,3',4,4'-benzophenone tetracarboxylic dianhydride, and 2,bromo-3,3',4,4'-benzophenone tetracarboxylic acid dianhydride. Trianhydrides such as the benzene and cyclohexene hexacarboxylic acid trianhydrides are also useful.

Additionally, useful polyanhydrides can be prepared by the maleinization of polyunsaturated compounds such as unsaturated rubbers, unsaturated oils and unsaturated hydrocarbons, or by the ring closure and decarboxylation of materials having multiple diacid groups.

The ratios of equivalents of isocyanate and anhydride to active hydrogen can be widely varied within the practice of this invention provided that the polyanhydride is present in at least a pot-life extending amount. Typically, the polyanhydride will be present at a level to provide at least about 0.01 equivalents of anhydride for each equivalent of active hydrogen from the hydroxyl or amine groups. Generally about 0.01 to about 0.5, and preferably about 0.05 to about 0.3, equivalents of anhydride will be present for each equivalent of active hydrogen from the hydroxyl or amine groups. The polyisocyanate will typically be present at a level to provide about 0.3 to about 1.5, and preferably about 0.7 to about 1.3 equivalents of isocyanate for each equivalent of active hydrogen from the hydroxyl or amine groups. The total equivalents of anhydride and isocyanate combined will generally total about 0.8 to about 1.6, and preferably about 1.0 to about 1.4 equivalents for each equivalent of active hydrogen from the hydroxyl or amine groups.

The curable compositions of this invention can be cured at temperatures ranging from about room temperature up to about 350° F. If used as coatings, the curable compositions can be used as clear coatings or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The coatings may also contain other additives such as flow agents, catalysts, diluents, solvents, ultraviolet light absorbers, etc. It is frequently useful to incorporate materials reactive with the polyisocyanate or the polyanhydride as reactive diluents. Epoxides, oxazolidines, oxazolines, ketamines and other such reactive materials can be utilized. Catalysts for the reaction between the polyisocyanate and the active hydrogen-containing material will normally be incorporated. Typical catalysts include tertiary amines such as N-ethyl morpholine and triethylamine and organometalic catalysts such as dibutyl tin dilaurate, zinc octoate, copper naphthenate, phenyl mercuric propionate, lead naphthenate, etc. Metal catalysts are especially preferred in the practice of this invention.

The coatings of this invention may typically be applied to any substrate such as metal, plastic, wood, glass, synthetic fibers, etc. by brushing, dipping, roll coating, flow coating, spraying or other method conventionally employed in the coating industry. If desired, the substrates may be primed prior to application of the coatings of this invention.

One preferred application of the curable compositions of this invention relates to their use as clearcoats and/or basecoats in clearcoat/basecoat formulations. Low VOC clearcoats are an especially useful application of this invention.

Clearcoat/basecoat systems are well known, especially in the automobile industry where it is especially useful to apply a pigmented basecoat, which may contain metallic pigments, to a substrate and allow it to form a film followed by the application of a clearcoat. The basecoat composition may be any of the polymers known to be useful in coating compositions including the reactive compositions of this invention.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters for either type of polymer include methyl methacrylate, ethyl methacrylate, propyl methacrylate, butyl methacrylate, ethyl acrylate, butyl acrylate vinyl acetate, acrylonitrile, acrylamide, styrene, vinyl chloride, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a polyisocyanate, a polyepoxide, or a nitrogen resin such as a condensate of an aldehyde such as formaldehyde with a nitrogeneous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and polycarboxylic acids, with or without the inclusion of natural drying oil fatty acids as described elsewhere in this specification. The polyesters or alkyds may contain a proportion of free hydroxyl and/or groups which are available for reaction, if desired with suitable crosslinking agents as discussed above.

If desired, the basecoat composition may also contain minor amounts of a cellulose ester, to alter the drying or viscosity characteristics of the basecoat.

Typically, the basecoat will include pigments conventionally used for coating compositions and after being applied to a substrate, which may or may not previously have been primed, the basecoat will be allowed sufficient time to form a polymer film which will not be lifted during the application of the clearcoat. The basecoat may be heated or merely allowed to air-dry to form the film. Generally, the basecoat will be allowed to dry for about 1 to 20 minutes before application of the clearcoat. The clearcoat is then applied to the surface of the basecoat, and the system can be allowed to dry at room temperature or, if desired, can be force dried by baking the coated substrate at temperatures typically ranging up to about 350° F.

Typically, the clearcoat may contain ultraviolet light absorbers such as hindered phenols or hindered amines at a level ranging up to about 6% by weight of the vehicle solids as is will known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.2 to about 6, and especially about 0.5 to about 3.0, mils.

If desired, the novel reactive compositions taught herein could be used as a basecoat, in which case the clearcoat could also comprise the novel reactive coatings taught herein, or the polymers taught herein as being useful as basecoat formulations could be utilized as clearcoats.

The following examples have been selected to illustrate specific embodiments and practices of advantage to a more complete understanding of the invention. Unless otherwise stated, "parts" means parts-by-weight and "percent" is percent-by-weight. The viscosity was measured in seconds using a number 4 Ford cup, and tack-free and gel times are given in hours. Hardness numbers (KPH) are Knoop Pendulum Hardness. Primers, sealers, basecoats and clearcoats were all spray applied. When utilized, the polyanhydride and the polyisocyanate were added to the active hydrogen-containing component immediately prior to application to substrate.

EXAMPLE A

Polyanhydride

A 4-neck, round bottomed flask equipped with mechanical stirrer, reflux condenser, thermometer, nitrogen inlet, water trap and fluid metering pump was charged with 1,280 parts xylene and 170.2 parts maleic anhydride. The materials were heated to reflux (139° C.) under nitrogen for a period of 15 minutes to remove water, and the reaction mixture was then cooled to 120° C. To this solution was added a monomer mixture of 591.6 parts isobutyl methacrylate, 918 parts butyl methacrylate, 122.4 parts methacrylic acid, 102 parts maleic anhydride and 61.2 parts t-butyl peroctoate that was metered into the reaction vessel at a constant rate over 3 hours. Halfway through the monomer addition, 135.8 parts of maleic anhydride was charged. The reaction mixture was maintained at 120° C. for an additional 15 minutes after the completion of all of the monomer addition. A solution of 80 parts xylene and 10.2 parts t-butyl peroctoate was added to the reaction over a 45 minute period. The reaction was held for 1½ hours at 120° C., heated to reflux (136° C.) for ½ hour to remove water and then the product was cut to 50% theoretical NVM by the addition of 680 parts xylene.

EXAMPLE B

Polyanhydride

In like manner to Example A, an anhydride-functional polymer was prepared by charging the reaction vessel with 1,634.0 parts xylene and 264.0 parts maleic anhydride which was then heated to reflux. A monomer mix of 1,372.8 parts butyl acrylate, 739.2 parts methyl methacrylate, 132.0 parts maleic anhydride and 59.4 parts t-butyl peroctoate was gradually added to the reaction mixture over approximately a 3 hour period. At approximately half way through the 3 hour addition, an additional charge of 132.0 parts maleic anhydride was added to the reaction mixture. After the 3 hour monomer addition period was completed, the reaction mixture was held at reflux for 15 minutes followed by a 45 minute gradual addition of 13.2 parts t-butyl peroctoate in 126.0 parts xylene. After the completion of that addition, the reaction mixture was held for an additional 2 hours at reflux to produce the anhydride-functional polymer.

EXAMPLE C

Polyol

A hydroxy-functional polymer was prepared using equipment as described in Example A, by charging the reaction vessel with 800.0 parts methyl amyl ketone which was heated to reflux (139° C.). A monomer mixture comprising 896.0 parts hydroxyethyl methacrylate, 640.0 parts styrene, 640.0 parts methyl methacrylate, 1,024.0 parts butyl methacrylate, 64.0 parts 2-mercapto ethanol and 256.0 parts t-butyl peroctoate was added to the reaction vessel over approximately a 3 hour period while maintaining the temperature at approximately 135° C. Upon completion of the 3 hour monomer addition, the reaction mixture was allowed to cool to 130° C. over about 15 minutes. 9.6 parts of t-amyl(2-ethylhexyl)monoperoxy carbonate was then added over approximately a 10 minute period and the reaction mixture was held at 130° C. for 20 minutes followed by a second 10 minute addition of 9.6 parts of t-amyl(2-ethylhexyl)- monoperoxy carbonate after which the reaction mixture was held for an additional 30 minutes at 130° C. The reaction mixture was then reheated to reflux and held at reflux for 1½ hours to produce the hydroxy-functional polymer.

EXAMPLE D

Polyol

In like manner to Example C, a hydroxy-functional polymer was prepared by charging the reaction vessel with 750.0 parts methyl amyl ketone which was heated to reflux. A monomer mixture comprising 840.0 parts hydroxyethyl methacrylate, 540.0 parts styrene, 540.0 parts methyl methacrylate, 1,080.0 parts butyl methacrylate, 60.0 parts 2-mercapto ethanol and 240.0 parts t-butyl peroctoate was added over a 3 hour period while maintaining the reaction mixture between 136° C.-139° C. After completion of the addition, the reaction mixture was held for an additional 15 minutes at 130° C. and 9.0 parts of t-amyl(2-ethylhexyl)-monoperoxy carbonate was charged over a 10 minute period and the reaction mixture was maintained at 130° C. for an additional 20 minutes. A second charge of 9.0 parts t-amyl(2-ethylhexyl)monoperoxy carbonate was then charged over a 10 minute period and the reaction mixture was maintained for 1 hour at 130° C. and then heated to reflux for an additional 30 minutes. The reaction mixture was then allowed to cool to 130° C. and 250.0 parts methyl amyl ketone was added to the reaction mixture to yield the final hydroxy-functional polymer.

EXAMPLE 1

A clear coating having an equivalent ratio of isocyanate/hydroxyl of 1.1/1 and no polyanhydride was prepared according to the following recipe:

| RAW MATERIAL | PARTS |
| --- | --- |
| Hydroxy-functional polymer of Example C | 287.58 |
| 2-ethyl-1,3-hexane diol | 38.56 |
| Solvent blend[1] | 275.08 |
| Byk ® 300[2] | 2.50 |
| Tinuvin ® 292[3] | 2.94 |
| 2% dibutyltin dilaurate solution | 9.44 |
| Tolonate ® HDT100 LV[4] | 209.98 |

EXAMPLE 2

A clear composition having an equivalent ratio of anhydride/isocyanate/hydroxyl of 0.1/1.1/1 was prepared according to the following recipe:

| RAW MATERIAL | PARTS |
| --- | --- |
| Hydroxy-functional polymer of Example C | 259.44 |
| 2-ethyl-1,3-hexane diol | 34.78 |
| Solvent blend | 224.15 |
| Byk ® 300 silicone resin solution | 2.50 |
| Tinuvin ® 292 | 9.45 |
| Dibutyltin dilaurate solution | 8.52 |
| Anhydride-functional polymer of Example A | 104.76 |
| Tolonate ® HDT100 LV | 189.43 |

The clearcoatings from Examples 1 and 2 each had a VOC of 3.5 and were spray applied over Q-steel test panels which had been prepared by application of a sealer (Q-seal P1A60, commercially available from The Sherwin-Williams Company) and a basecoat (ULTRABASE 7, commercially available from The Sherwin-Williams Company). The clearcoats were applied at approximately 2.25 mils dry film thickness over the prepared test panels. The clearcoatings exhibited physical and performance characteristics as set forth below:

| Example | Initial Visc. | Tack-Free Time | GEL Time | KPH 1 day | KPH 1 wk. | KPH 2 wks. | KPH 4 wks. |
| --- | --- | --- | --- | --- | --- | --- | --- |
| 1 | 16.4 | <2.5 | <4.0 | 15 | 24 | 28 | 24 |
| 2 | 22.6 | <4.6 | 8.5 | 25 | 42 | 51 | 44 |

As shown in the test results, the addition of only 0.1 equivalent of polyanhydride significantly increased the gel time of the liquid coating and significantly increased the hardness of the cured clearcoating.

EXAMPLES 3-7

Clearcoatings were prepared according to the following recipes:

Polyol Solution

A polyol solution was prepared according to the following recipe:

| RAW MATERIAL | PARTS |
| --- | --- |
| SCX910 acrylic polyol[5] | 176.75 |
| EXXATE ® 700 | 11.67 |
| Methyl isobutyl ketone | 76.36 |
| 2-ethyl-1,3-hexane diol | 82.85 |
| Tinuvin 292 | 3.64 |
| Byk ® 300 | .98 |
| Byk ® 306[6] | 1.22 |
| SILWET ® surfactant L-77[7] | .68 |
| DBE-9 | 9.00 |
| Xylene | 14.40 |
| 2% solution dibutyltin dilaurate | 7.67 |

[5]Acrylic polyol at 71% solids in methyl n-amyl ketone, having a density of 8.7 lbs/gal, and having a hydroxyl number (solids) of 94 and a hydroxyl equivalent weight (solids) of 600. Available from SC Johnson Wax of Racine, Wisconsin.
[6]Flow control agent sold by Byk-Malinkrodt.
[7]Surfactant commercially available from Union Carbide Corporation.

Isocyanate Solution

An isocyanate solution was prepared for use in Examples 3-7 according to the following recipe:

| RAW MATERIAL | PARTS |
| --- | --- |
| Tolonate ® HDT100 LV | 333.04 |
| DBE-9 | 45.68 |
| Xylene | 3.17 |

The polyol solution and the isocyanate solution were combined with other materials according to the following recipes to produce the working examples.

| Example | Polyol Solution | Raw Material Parts by Weight | | | Equivalent Ratio ANH/NCO/OH |
|---|---|---|---|---|---|
| | | Isocyanate Solution | Polyanhydride of Example A | Polyanhydride of Example B | |
| 3 | 50.78 | 50.29 | 0.0 | 0.0 | 0.0/1.3/1.0 |
| 4 | 50.78 | 50.29 | 25.25 | 0.0 | 0.25/1.3/1.0 |
| 5 | 50.78 | 50.29 | 11.22 | 0.0 | 0.13/1.3/1.0 |
| 6 | 50.78 | 50.29 | 0.0 | 25.25 | 0.25/1.3/1.0 |
| 7 | 50.78 | 50.29 | 0.0 | 11.22 | 0.13/1.3/1.0 |

The clears were applied over Q-steel panels primed with Sherwin-Williams Grey Epoxy Primer E2A 976 and gave the following characteristics:

| Example | Initial Viscosity | Gel Time | Dry to Touch | KPH | | | |
|---|---|---|---|---|---|---|---|
| | | | | 1 day | 1 wk. | 2 wks. | 7 wks. |
| 3 | 26 | 1.1 | 2.7 | 20 | 21 | 21 | 41 |
| 4 | 27 | 9.5+ | 3.3 | 30 | 83 | 83 | 100 |
| 5 | 23 | 9.5+ | 3.2 | 19 | 77 | 76 | 89 |
| 6 | 31 | 9.5+ | 3.0 | 30 | 84 | 84 | 93 |
| 7 | 28 | 9.5+ | 3.5+ | 16 | 86 | 86 | 96 |

The addition of the anhydride to these systems shows the increase in gel time of the liquid coating and the increase in hardness of the coating as it cures.

EXAMPLES 8-11

Clearcoatings were prepared according to the following recipes:

| RAW MATERIAL | EXAMPLE 8 | EXAMPLE 9 | EXAMPLE 10 | EXAMPLE 11 |
|---|---|---|---|---|
| Polyol of Example D | 227.38 | 245.42 | 270.92 | 296.93 |
| Diluent #1[8] | 129.93 | 140.30 | — | — |
| Diluent #2[9] | — | — | 45.76 | 53.44 |
| Byk ® 300 | 3.00 | 3.00 | 3.00 | 3.00 |
| Tinuvin ® 292 | 9.26 | 9.23 | 9.21 | 9.13 |
| 2% dibutyltin dilaurate solution | 8.55 | 9.23 | 8.37 | 9.15 |
| Polyanhydride of Example 1 | 79.99 | — | 95.30 | — |
| Tolonate HDT100 LV | 143.33 | 154.70 | 170.73 | 187.17 |
| ANH/NCO/ Active hydrogen equivalents | 0.1/1.1/1.0 | 0.0/1.1/1.0 | 0.1/1.1/1.0 | 0.0/1.1/1.0 |

[8]Desmophen LS-2973E amine diluent from Mobay Corporation having an equivalent weight of 325 and a density of 1.04 supplied as a 90% NVM solution in n-butyl acetate.
[9]Bicyclic oxazolidine reactive diluent from Angus Chemical Company having the composition 1-aza-3,7-dioxo-bicyclo-2,8-diisopropyl-5-ethyl (3.3.0)-octane.

All Examples 8 through 11 were reduced to a final NVM of 57–58% by addition of a blend of butyl acetate/ethyl 3-ethoxy propionate/methyl n-amyl ketone/methyl isobutyl ketone/methyl ethyl ketone/xylene in a 57/10/18/5/5/5 ratio in parts by weight. The reduced clearcoatings were spray applied to Q-steel panels which had been coated with a sealer (E2G980 GBP ® commercially available from The Sherwin-Williams Company) and a basecoat (ULTRABASE ® 7 commercially available from The Sherwin-Williams Company). The clearcoatings were dry-to-touch within about 1–1½ hours and also exhibited physical and performance characteristics as follows:

| Example | Initial Viscosity | Gel Time | 20° Gloss | KPH | | | |
|---|---|---|---|---|---|---|---|
| | | | | 1 day | 1 wk. | 2 wks. | 4 wks. |
| 8 | 16 | 9 | 88 | 20 | 29 | 29 | 30 |
| 9 | 13 | 4 | 85 | 17 | 25 | 23 | 27 |
| 10 | 18 | 9 | 87 | 25 | 41 | 39 | 39 |
| 11 | 14 | 2 | 89 | 27 | 36 | 36 | 36 |

Even when used in combination With polyamine or oxazolidine diluents, the polyanhydrides extend pot-life and provide improved hardness.

While this invention has been described by a number of specific embodiments, it is obvious that other variations and modifications may be made without departing from the spirit and scope of the invention as set forth in the appended claims.

The invention claimed is:

1. A method for extending the pot-life of a curable composition comprising a mixture of (i) at least one polyol or polyamine, and (ii) a polyisocyanate, which method comprises incorporating within the mixture a pot-life extending amount of an anhydride-functional polymer having an average of at least two anhydride groups per molecule, wherein the anhydride-functional polymer is the addition polymerization reaction product of at least one unsaturated monomer having anhydride functionality and at least one other ethylenically unsaturated monomer copolymerizable therewith.

2. The method of claim 1 wherein the anhydride-functional polymer is the addition polymerization reaction product of:
   (a) 5 to about 40 weight percent of an ethylenically unsaturated monoanhydride; and
   (b) 60 to 95 weight percent of at least one other ethylenically unsaturated monomer copolymerizable with the ethylenically unsaturated anhydride.

3. The method of claim 2 wherein the monoanhydride is maleic anhydride.

4. The method of claim 1 wherein the anhydride-functional polymer is present at a level to provide at least about 0.01 equivalents of anhydride for each equivalent of active hydrogen from the hydroxyl or amine groups of the polyol or polyamine.

5. The method of claim 1 wherein the anhydride-functional polymer is present at a level to provide about 0.01 to about 0.5 equivalents of anhydride for each equivalent of active hydrogen from the hydroxyl or amine groups of the polyol or polyamine.

6. The method of claim 1 wherein the anhydride-functional polymer is present at a level to provide between about 0.05 to about 0.3 equivalents of anhydride for each equivalent of active hydrogen from the hydroxyl or amine groups of the polyol or polyamine.

7. The method of claim 1 wherein the polyisocyanate is present at a level to provide about 0.03 to about 1.5 equivalents of isocyanate for each equivalent of active hydrogen from the hydroxyl or amine groups of the polyol or polyamine, and the anhydride-functional polymer is present at a level to provide between about 0.01 to about 0.5 equivalents of anhydride for each equivalent of active hydrogen from the hydroxyl or amine groups of the polyol or polyamine.

8. The method of claim 1 wherein the total equivalents of anhydride and isocyanate combined total 0.08 to about 1.6 equivalents for each equivalent of active hydrogen from the hydroxyl or amine groups of the polyol or polyamine.

9. In a substrate coated with a multi-layer decorative and/or protective coating which comprises:
   (a) a basecoat comprising a pigmented film-forming polymer; and
   (b) a transparent clearcoat comprising a film-forming polymer applied to the surface of the basecoat composition;
the improvement which comprises utilizing as the clearcoat and/or the basecoat a curable composition comprising:
   (i) at least one polyol or polyamine; and
   (ii) a polyisocyanate; and
   (iii) an anhydride-functional polymer having an average of at least about two anhydride groups per molecule, wherein the anhydride-functional polymer is the addition polymerization reaction product of at least one unsaturated monomer having anhydride functionality and at least one other ethylenically unsaturated monomer copolymerizable therewith.

10. The coated substrate of claim 9 wherein the polyol comprises a hydroxy-functional polymer having a number average molecular weight of at least about 400.

11. The coated substrate of claim 10 wherein the curable composition also comprises a polyol or polyamine having a number average molecular weight less than about 400.

12. The coated substrate of claim 10 wherein the hydroxy-functional polymer comprises the addition polymerization reaction product of:
   (a) 10 to about 40 weight percent of a hydroxy-functional ethylenically unsaturated monomer, and
   (b) 60 to about 90 weight percent of at least one ethylenically unsaturated monomer copolymerizable with the hydroxy-functional monomer.

13. The coated substrate of claim 9 wherein the anhydride-functional polymer is the addition polymerization reaction product of:
   (a) 5 to about 40 weight percent of an ethylenically unsaturated monoanhydride; and
   (b) 60 to 95 weight percent of at least one other ethylenically unsaturated monomer copolymerizable with the ethylenically unsaturated anhydride.

14. The coated substrate of claim 13 wherein the monoanhydride is maleic anhydride.

15. The coated substrate of claim 9 wherein the anhydride-functional polymer is present in a pot-life extending amount.

16. The coated substrate of claim 15 wherein the anhydride-functional polymer is present at a level to provide at least about 0.01 equivalents of anhydride for each equivalent of active hydrogen from the hydroxyl or amine groups of the polyol or polyamine.

17. The coated substrate of claim 9 wherein the anhydride-functional polymer is present at a level to provide about 0.01 to about 0.5 equivalents of anhydride for each equivalent of active hydrogen from the hydroxyl or amine groups of the polyol or polyamine.

18. The coated substrate of claim 9 wherein the anhydride-functional polymer is present at a level to provide between about 0.05 and 0.3 equivalents of anhydride for each equivalent of active hydrogen from the hydroxyl or amine groups of the polyol or polyamine.

19. The coated substrate of claim 9 wherein the polyisocyanate is present at a level to provide about 0.03 to about 1.5 equivalents of isocyanate for each equivalent of active hydrogen from the hydroxyl or amine groups of the polyol or polyamine, and the anhydride-functional polymer is present at a level to provide between about 0.01 to about 0.5 equivalents of anhydride for each equivalent of active hydrogen from the hydroxyl or amine groups of the polyol or polyamine.

20. The coated substrate of claim 9 wherein the total equivalents of anhydride and isocyanate combined total 0.8 to about 1.6 equivalents for each equivalent of active hydrogen from the hydroxyl or amine groups of the polyol or polyamine.

21. A curable composition which comprises:
   (i) at least one polyol or polyamine; and
   (ii) a polyisocyanate; and
   (iii) an anhydride-functional polymer having an average of at least about two anhydride groups per molecule, wherein the anhydride-functional polymer is the addition polymerization reaction product of at least one unsaturated monomer having anhydride functionality and at least one other ethylenically unsaturated monomer copolymerizable therewith.

22. The curable composition of claim 21 wherein the polyol comprises a hydroxy-functional polymer having a number average molecular weight of at least about 400.

23. The composition of claim 22 wherein the curable composition also comprises a polyol or polyamine having a number average molecular weight less than about 400.

24. The curable composition of claim 22 wherein the hydroxy-functional polymer comprises the addition polymerization reaction product of
   (a) 10 to about 40 weight percent of a hydroxy-functional ethylenically unsaturated monomer, and
   (b) 60 to about 90 weight percent of at least one ethylenically unsaturated monomer copolymerizable with the hydroxy-functional monomer.

25. The curable composition of claim 21 wherein the anhydride-functional polymer is the addition polymerization reaction product of:
   (a) 5 to about 40 weight percent of an ethylenically unsaturated monoanhydride; and
   (b) 60 to 95 weight percent of at least one other ethylenically unsaturated monomer copolymerizable with the ethylenically unsaturated anhydride.

26. The curable composition of claim 25 wherein the monoanhydride is maleic anhydride.

27. The curable composition of claim 21 wherein the anhydride-functional polymer is present in a pot-life extending amount.

28. The curable composition of claim 21 wherein the anhydride-functional polymer is present at a level to provide at least about 0.01 equivalents of anhydride for each equivalent of active hydrogen from the hydroxyl or amine groups of the polyol or polyamine.

29. The curable composition of claim 28 wherein the anhydride-functional polymer is present at a level to provide about 0.01 to about 0.3 equivalents of anhydride for each equivalent of active hydrogen from the hydroxyl or amine groups of the polyol or polyamine.

30. The curable composition of claim 28 wherein the anhydride-functional polymer is present at a level to provide between about 0.05 to about 0.3 equivalents of anhydride for each equivalent of active hydrogen from the hydroxyl or amine groups of the polyol or polyamine.

31. The curable composition of claim 28 wherein the polyisocyanate is present at a level to provide about 0.03 to about 1.5 equivalents of isocyanate for each equivalent of active hydrogen from the hydroxyl or amine groups of the polyol or polyamine, and the anhydride-functional polymer is present at a level to provide between about 0.01 to about 0.5 equivalents of anhydride for each equivalent of active hydrogen from the hydroxyl or amine groups of the polyol or polyamine.

32. The curable composition of claim 21 wherein the total equivalents of anhydride and isocyanate combined total 0.8 to about 1.6 equivalents for each equivalent of active hydrogen from the hydroxyl or amine groups of the polyol or polyamine.

* * * * *

UNITED STATES PATENT AND TRADEMARK OFFICE
CERTIFICATE OF CORRECTION

PATENT NO. : 5,157,100
DATED : October 20, 1992
INVENTOR(S) : Babjak et la

It is certified that error appears in the above-indentified patent and that said Letters Patent is hereby corrected as shown below:

At column 3, line 26, "molecule Active" should be --molecule. Active--.

At column 5, line 24, "1.5." should be the start of a new paragraph.

At column 8, line 60, "acrylate vinyl" should be --acrylate, vinyl--.

At column 11, lines 45-49, the footnote references were omitted. Therefore, they should be as follows:
--[1]Methyl Isobutyl Ketone/EXXATE® 700 (acetic acid ester of a C7 alcohol made by Exxon Chemicals)/xylene/DBE-9 (ester solvent comprising about 25% dimethyl succinate, 73% dimethyl glutarate, 1.5% dimethyl adipate and 0.3% methanol made by E.I. du Pont de Nemours and Co.) in a 72.42/5.29/15.67/6.65 ratio in parts by weight.
[2]Flow control agent sold by Byk-Malinkrodt.
[3]Trademark of Ciba-Geigy for di[4(2,2,6,6-tetramethyl piperdinyl)]sebacate light stabilizer.
[4]Aliphatic polyisocyanate commercially available from Rhone-Poulenc believed to be primarily a trimer of hexamethylene diisocyanate.--

At column 14, line 21, "combination With" should be --combination with--.

At column 14, line 67, "0.03" should be --0.3--.

At column 15, line 8, "0.08" should be --0.8--.

At column 16, line 9, "0.03" should be --0.3--.

UNITED STATES PATENT AND TRADEMARK OFFICE
CERTIFICATE OF CORRECTION

PATENT NO. : 5,157,100

DATED : October 20, 1992

INVENTOR(S) : Babjak et al

It is certified that error appears in the above-indentified patent and that said Letters Patent is hereby corrected as shown below:

At column 17, line 12, "0.03" should be --0.30--.

Signed and Sealed this

Twenty-eighth Day of September, 1993

Attest:

BRUCE LEHMAN

Attesting Officer

Commissioner of Patents and Trademarks